(12) United States Patent
Chujo et al.

(10) Patent No.: US 12,111,654 B2
(45) Date of Patent: Oct. 8, 2024

(54) IN-VEHICLE WIRELESS COMMUNICATION APPARATUS, WIRELESS COMMUNICATION SYSTEM, WIRELESS COMMUNICATION APPARATUS, AND VEHICLE CONTROL METHOD

(71) Applicants: AutoNetworks Technologies, Ltd., Yokkaichi (JP); Sumitomo Wiring Systems, Ltd., Yokkaichi-shi (JP); Sumitomo Electric Industries, Ltd., Osaka (JP)

(72) Inventors: Makoto Chujo, Yokkaichi (JP); Hiromichi Yasunori, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 259 days.

(21) Appl. No.: 17/759,055

(22) PCT Filed: Jan. 6, 2021

(86) PCT No.: PCT/JP2021/000201
§ 371 (c)(1),
(2) Date: Jul. 19, 2022

(87) PCT Pub. No.: WO2021/149492
PCT Pub. Date: Jul. 29, 2021

(65) Prior Publication Data
US 2023/0042459 A1     Feb. 9, 2023

(30) Foreign Application Priority Data
Jan. 21, 2020    (JP) .................. 2020-007703

(51) Int. Cl.
*G05D 1/00*     (2024.01)
*G05D 1/226*    (2024.01)
(Continued)

(52) U.S. Cl.
CPC ......... *G05D 1/0022* (2013.01); *G05D 1/0223* (2013.01); *G05D 1/226* (2024.01);
(Continued)

(58) Field of Classification Search
None
See application file for complete search history.

(56) References Cited

U.S. PATENT DOCUMENTS 11,228,569 B2 *  1/2022  Westra ................ H04L 63/0823
11,447,096 B2 *  9/2022  Toyooka ................ E05B 49/00
(Continued)

FOREIGN PATENT DOCUMENTS

| JP | 2003-118550 A | 4/2003 |
| JP | 2012-105082 A | 5/2012 |
| JP | 2019-202605 A | 11/2019 |

OTHER PUBLICATIONS

International Search Report, Application No. PCT/JP2021/000201, mailed Mar. 23, 2021. ISA/Japan Patent Office.

*Primary Examiner* — Todd Melton
(74) *Attorney, Agent, or Firm* — Honigman LLP (57) ABSTRACT

Provided are an in-vehicle wireless communication apparatus, a wireless communication system, a wireless communication apparatus, and a vehicle control method configured to realize prompt external control of a vehicle. An in-vehicle wireless communication apparatus according to the present embodiment includes a wireless communication unit configured to perform wireless communication with an out-of-vehicle apparatus installed outside the vehicle, and a processing unit configured to perform processing related to
(Continued)

communication, and the processing unit transmits information regarding a data format of control data to be output to an in-vehicle network by an in-vehicle control apparatus that controls the vehicle, to the out-of-vehicle apparatus using the wireless communication unit, receives data transmitted from the out-of-vehicle apparatus using the wireless communication unit, the data including control data having the data format, and outputs the control data included in the received data to the in-vehicle network.

8 Claims, 7 Drawing Sheets

(51) Int. Cl.
*G07C 5/00* (2006.01)
*H04W 4/44* (2018.01)
*G07C 9/00* (2020.01)

(52) U.S. Cl.
CPC .......... *G05D 1/2265* (2024.01); *G07C 5/008* (2013.01); *H04W 4/44* (2018.02); *G07C 9/00182* (2013.01); *G07C 2009/00269* (2013.01)

(56) References Cited

U.S. PATENT DOCUMENTS

| | | |
|---|---|---|
| 11,513,512 B2 * | 11/2022 | Suzuki ................ G05D 1/0022 |
| 11,543,817 B2 * | 1/2023 | Takechi ................ H04W 4/024 |
| 2012/0330480 A1 | 12/2012 | Nishiseko |
| 2020/0133261 A1 * | 4/2020 | Tao ........................ G08G 1/164 |
| 2020/0145252 A1 | 5/2020 | Torisaki et al. |

* cited by examiner

IN-VEHICLE WIRELESS COMMUNICATION APPARATUS, WIRELESS COMMUNICATION SYSTEM, WIRELESS COMMUNICATION APPARATUS, AND VEHICLE CONTROL METHOD

CROSS-REFERENCE TO RELATED APPLICATIONS

This application is the U.S. national stage of PCT/JP2021/000201 filed on Jan. 6, 2021, which claims priority of Japanese Patent Application No. JP 2020-007703 filed on Jan. 21, 2020, the contents of which are incorporated herein.

TECHNICAL FIELD

The present disclosure relates to an in-vehicle wireless communication apparatus, a wireless communication system, a wireless communication apparatus, and a vehicle control method for controlling a vehicle through road-to-vehicle wireless communication.

BACKGROUND

Heretofore, road-to-vehicle wireless communication systems in which various types of information are provided from roadside wireless communication apparatuses installed on roads to in-vehicle wireless communication apparatuses mounted in vehicles using wireless signals have come into practical use.

Information that is transmitted from a roadside wireless communication apparatus to an in-vehicle wireless communication apparatus can be information such as the illumination state of a traffic light and traffic information regarding the surrounding region, and, in a vehicle that has received such information, it is possible to perform processing such as calling attention to the driver of the vehicle or driving assistance control of the vehicle.

In JP 2003-118550A, a vehicle stop control system is proposed in which an administrator's terminal device causes a roadside apparatus to distribute a specific owner code in response to a request from a terminal device of the owner of a vehicle, and a vehicle control apparatus of the vehicle that receives the owner code automatically changes the vehicle to a stop control mode so as to forcefully stop the vehicle while using inter-vehicle control. This vehicle stop control system is a system that has an object of forcefully stopping a stolen vehicle and grasping the stop position.

When there is a need to externally forcefully control a vehicle, a case is conceivable in which a stolen car is stopped as with the vehicle stop control system described in JP 2003-118550A, and a case is also conceivable in which a vehicle is stopped in order to prevent an accident in advance, for example. A vehicle that requires urgent action needs to be controlled as promptly as possible.

The present disclosure has been made in light of such a situation, and an object of the present disclosure is to provide an in-vehicle wireless communication apparatus, a wireless communication system, a wireless communication apparatus, and a vehicle control method that can be expected to realize prompt external control of a vehicle.

SUMMARY

An in-vehicle wireless communication apparatus according to an aspect of the present disclosure is an in-vehicle wireless communication apparatus that is to be mounted in a vehicle, and includes a wireless communication unit configured to perform wireless communication with an out-of-vehicle apparatus installed outside the vehicle, and a processing unit configured to perform processing related to communication, and the processing unit transmits information regarding a data format of control data to be output to an in-vehicle network by an in-vehicle control apparatus that controls the vehicle, to the out-of-vehicle apparatus using the wireless communication unit, receives data transmitted from the out-of-vehicle apparatus using the wireless communication unit, the data including control data having the data format, and outputs the control data included in the received data to the in-vehicle network.

The present application can be realized not only as an apparatus that includes the above-described characteristic processing units, but also as a method that includes the above-described characteristic processing as steps, or a computer program for causing a computer to execute the steps. The present application can be realized as a semiconductor integrated circuit that realizes some or all of such apparatuses, or as another apparatus or system that includes such apparatuses.

Advantageous Effects

According to the above aspect, it can be expected that external control of a vehicle is performed promptly.

DETAILED DESCRIPTION OF PREFERRED EMBODIMENTS

First, embodiments of the present disclosure will be listed and described. At least some of the embodiments to be described below may be suitably combined.

First Aspect

An in-vehicle wireless communication apparatus according to a first aspect of the present disclosure is an in-vehicle wireless communication apparatus that is to be mounted in a vehicle, and includes a wireless communication unit configured to perform wireless communication with an out-of-vehicle apparatus installed outside the vehicle, and a processing unit configured to perform processing related to communication, and the processing unit transmits information regarding a data format of control data to be output to an in-vehicle network by an in-vehicle control apparatus that controls the vehicle, to the out-of-vehicle apparatus using the wireless communication unit, receives data transmitted from the out-of-vehicle apparatus using the wireless communication unit, the data including control data having the data format, and outputs the control data included in the received data to the in-vehicle network.

In the first aspect, the in-vehicle control apparatus controls the vehicle by outputting the control data to the in-vehicle network, and the in-vehicle wireless communication apparatus transmits information regarding the data format of this control data to the out-of-vehicle apparatus provided outside the vehicle, through wireless communication. Accordingly, the out-of-vehicle apparatus can be aware of the data format of control data for controlling the vehicle, and, when there is a need to externally control the vehicle, the out-of-vehicle apparatus can create control data having this data format and transmit the control data to the vehicle. The in-vehicle wireless communication apparatus that has received data from the out-of-vehicle apparatus outputs the control data included in the received data, to the in-vehicle network. Accordingly, control corresponding to the control data output to the in-vehicle network is performed on the vehicle. The out-of-vehicle apparatus creates and transmits control data in accordance with the data format notified from the in-vehicle wireless communication apparatus in advance, and the vehicle that has received this control data is controlled by simply transmitting/receiving the received control data, without interpreting a control instruction from the out-of-vehicle apparatus, or the like, and thus it can be expected that external control of a vehicle is performed promptly.

Second Aspect

Preferably, in a second aspect, the in-vehicle control apparatus and an in-vehicle apparatus to be controlled by the in-vehicle control apparatus are mounted in the vehicle, and the processing unit transmits the control data included in data received from the out-of-vehicle apparatus, to the in-vehicle apparatus without the in-vehicle control apparatus intervening therebetween.

In the second aspect, the above-described in-vehicle control apparatus and an in-vehicle apparatus to be controlled by this in-vehicle control apparatus are mounted in the vehicle, and the vehicle is controlled in response to the in-vehicle apparatus receiving control data from the in-vehicle control apparatus. The in-vehicle wireless communication apparatus that has received data from the out-of-vehicle apparatus directly transmits control data included in this data to the in-vehicle apparatus without involving the in-vehicle control apparatus. Accordingly, delays and the like do not occur due to the in-vehicle control apparatus intervening, and it is possible to more promptly transmit/receive control data from the in-vehicle wireless communication apparatus to the in-vehicle apparatus.

Third Aspect

Preferably, in a third aspect, the control data included in the data received from the out-of-vehicle apparatus is control data for causing the in-vehicle apparatus to perform control for stopping travelling of the vehicle.

In the third aspect, the out-of-vehicle apparatus transmits control data for stopping travelling of the vehicle to the vehicle, and the vehicle stops travelling in accordance with this control data. Accordingly, when travelling of the vehicle is externally stopped for the purpose of preventing the occurrence of an accident in advance, or the like, it can be expected that the vehicle will be more promptly stopped.

Fourth Aspect

Preferably, in a fourth aspect, the control data included in the data received from the out-of-vehicle apparatus is control data for causing the in-vehicle apparatus to perform control for unlocking doors of the vehicle.

In the third aspect, the out-of-vehicle apparatus transmits control data for unlocking the doors of the vehicle to the in-vehicle wireless communication apparatus, and the vehicle unlocks the doors in accordance with this control data. Accordingly, when a disaster occurs or the like, when there is a need to unlock doors urgently, it can be expected that the doors will be unlocked more promptly.

Fifth Aspect

Preferably, in a fifth aspect, data that is received from the out-of-vehicle apparatus includes the control data and accompanying information that accompanies wireless communication, and the processing unit outputs the control data obtained by removing the accompanying information from the data received from the out-of-vehicle apparatus, to the in-vehicle network.

In the fifth aspect, data that is transmitted to the in-vehicle wireless communication apparatus by the out-of-vehicle apparatus includes control data for controlling the vehicle and accompanying information such as a header and a footer that accompany wireless communication. The in-vehicle wireless communication apparatus obtains the control data by removing the accompanying information from the received data, and directly outputs this control data to the in-vehicle network, thereby realizing control of the vehicle corresponding to the control data. The in-vehicle wireless communication apparatus can obtain control data by performing simple processing for removing accompanying information.

Sixth Aspect

A wireless communication system according to a sixth aspect is a wireless communication system in which wireless communication is performed between an in-vehicle wireless communication apparatus that is to be mounted in a vehicle, and includes a wireless communication unit configured to perform wireless communication with an apparatus outside the vehicle and a processing unit configured to perform processing related to communication, and an out-of-vehicle apparatus that is to be mounted outside the vehicle, and includes a wireless communication unit configured to perform wireless communication with the vehicle and a processing unit configured to perform processing related to communication, the processing unit of the in-vehicle wireless communication apparatus transmits, to the out-of-vehicle apparatus, information regarding a data format of control data to be output to an in-vehicle network by an in-vehicle control apparatus that controls the vehicle, the processing unit of the out-of-vehicle apparatus receives the information regarding the data format transmitted by the in-vehicle wireless communication apparatus, generates control data for controlling the vehicle based on the received information, the control data having the data format, and transmits data that includes the generated control data to the in-vehicle wireless communication apparatus, and the processing unit of the in-vehicle wireless communication apparatus receives the data transmitted by the out-of-vehicle apparatus, and outputs the control data included in the received data to the in-vehicle network.

In the sixth aspect, similarly to the first aspect, it can be expected that the vehicle will be promptly externally controlled.

Seventh Aspect

Preferably, in a seventh aspect, an in-vehicle apparatus to be controlled by the in-vehicle control apparatus and an in-vehicle relay apparatus that receives control data transmitted by the in-vehicle control apparatus and transmits the control data to the in-vehicle apparatus are mounted in the vehicle, and the in-vehicle relay apparatus receives control data transmitted by the in-vehicle wireless communication apparatus, and transmits the received control data to the in-vehicle apparatus without the in-vehicle control apparatus intervening therebetween.

In the seventh aspect, similarly to aspect the second aspect, it is possible to more promptly transmit/receive control data from the in-vehicle wireless communication apparatus to the in-vehicle apparatus.

Eighth Aspect

A wireless communication apparatus according to an eighth aspect is a wireless communication apparatus that includes a wireless communication unit configured to perform wireless communication with a vehicle, and a processing unit configured to perform processing related to communication, and the processing unit receives information regarding a data format transmitted by the vehicle, generates control data for controlling the vehicle based on the received information, the control data having the data format, and transmits data that includes the generated control data to the vehicle.

In the eighth aspect, similarly to the first aspect, it can be expected that the vehicle will be promptly externally controlled.

Ninth Aspect

In a vehicle control method according to a ninth aspect is a vehicle control method for controlling a vehicle in which an in-vehicle wireless communication apparatus that performs wireless communication with an out-of-vehicle apparatus installed outside the vehicle is mounted, the in-vehicle wireless communication apparatus transmits, to the out-of-vehicle apparatus, information regarding a data format of control data to be output to an in-vehicle network by an in-vehicle control apparatus that controls the vehicle, receives data that includes control data having the data format transmitted from the out-of-vehicle apparatus, and outputs the control data included in the received data to the in-vehicle network.

In this aspect, similarly to the first aspect, it can be expected that the vehicle will be promptly externally controlled.

Specific examples of a wireless communication system according to an embodiment of the present disclosure will be described below with reference to the drawings. The present disclosure is not limited to illustrations of these, but is indicated by the claims, and all changes that come within the meaning and range of equivalency of the claims are intended to be embraced therein.

System Configuration

Figure 1:
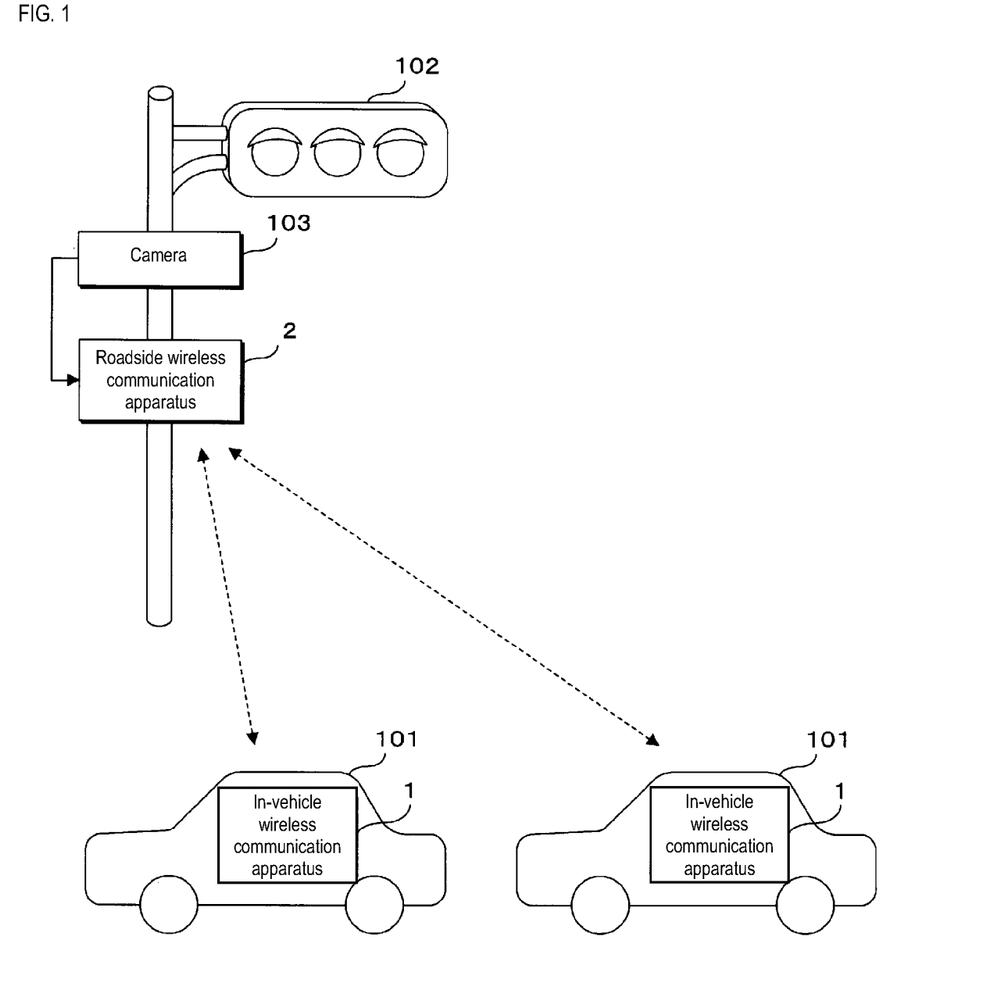
FIG. 1 is a schematic diagram for describing an overview of a wireless communication system according to an embodiment of the present embodiment.

FIG. 1 is a schematic diagram for describing an overview of a wireless communication system according to an embodiment of the present disclosure. The wireless communication system according to the present embodiment is a system in which wireless communication is performed between an in-vehicle wireless communication apparatus 1 mounted in a vehicle 101 and a roadside wireless communication apparatus 2 provided on a traffic light 102 installed at an intersection of a road or the like. Note that, in the present embodiment, the roadside wireless communication apparatus 2 is provided on the traffic light 102, but there is no limitation to this, and, for example, the roadside wireless communication apparatus 2 may also be provided on various types of facilities or equipment such as a street light installed on a road, a marker pole, a pedestrian walkway, or a guard rail. The in-vehicle wireless communication apparatus 1 can perform wireless communication with one or more roadside wireless communication apparatuses 2 that are present in a predetermined range (a range in which wireless radio waves reach the one or more roadside wireless communication apparatuses 2) from the vehicle 101. Similarly, the roadside wireless communication apparatus 2 can perform wireless communication with one or more in-vehicle wireless communication apparatuses 1 that are present in a predetermined range from the installation position of the traffic light 102.

In the wireless communication system according to the present embodiment, the roadside wireless communication apparatus 2 predicts the occurrence of an accident in the vicinity of an intersection, for example, based on image data of the intersection captured by a camera 103 provided on the traffic light 102 or the like. When it is predicted that an accident will occur, the roadside wireless communication apparatus 2 performs control for forcefully stopping the vehicle 101 that may be involved in the predicted accident. At this time, the roadside wireless communication apparatus 2 transmits data for forcefully stopping the vehicle 101 to the in-vehicle wireless communication apparatus 1 of the vehicle 101. The in-vehicle wireless communication apparatus 1 that has received this data stops the vehicle 101 by transferring this data to an in-vehicle apparatus that controls travelling of the vehicle 101.

In addition, for example, when a disaster such as an earthquake or flooding occurs, the roadside wireless communication apparatus 2 in the wireless communication system according to the present embodiment may perform control for forcefully unlocking the doors of the vehicle 101. Accordingly, it can be expected that rescue activities performed on the vehicle 101 will be facilitated. The roadside wireless communication apparatus 2 may determine, by itself, whether or not a disaster has occurred, for example, or the roadside wireless communication apparatus 2 may make such a determination by receiving communication indicating that a disaster has occurred from another apparatus through communication, for example.

Note that, in the wireless communication system according to the present embodiment, control of the vehicle 101 that is performed by the roadside wireless communication apparatus 2 is not limited to the above-described forced stop of the vehicle or unlocking of the doors, and any kind of control may be performed.

Figure 2:
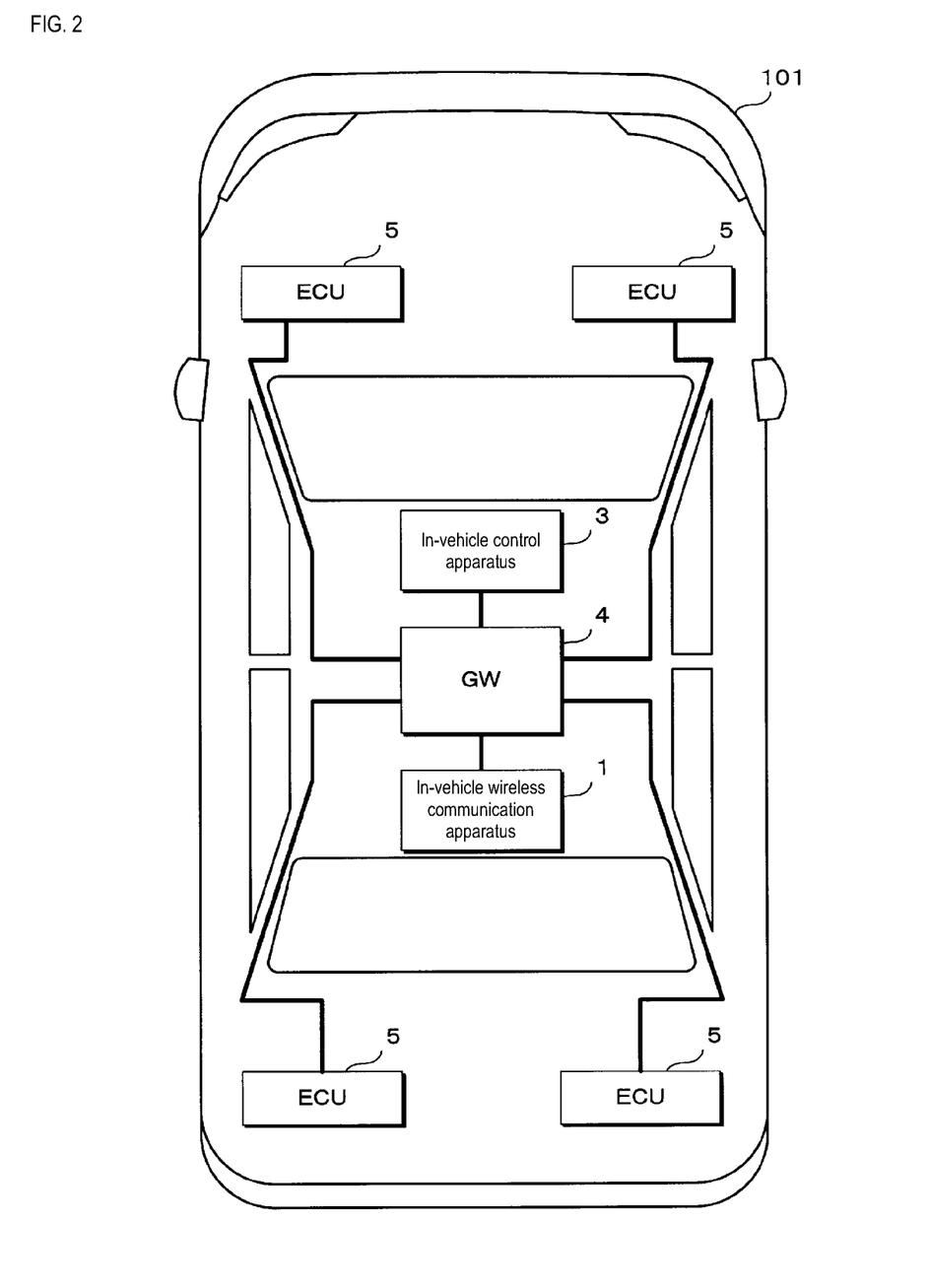
FIG. 2 is a schematic diagram showing a configuration example of a vehicle in the wireless communication system according to the present embodiment.

FIG. 2 is a schematic diagram showing a configuration example of the vehicle 101 of the wireless communication system according to the present embodiment. In the vehicle 101 according to the present embodiment, the above-described in-vehicle wireless communication apparatus 1 is mounted, and an in-vehicle control apparatus 3 and various apparatuses such as a GW (gateway) 4 and ECUs (Electronic Control Unit) 5 may also be mounted. The in-vehicle control apparatus 3 is an apparatus that controls the vehicle 101, and, for example, performs travel control such as steering, acceleration/deceleration, or stopping of the vehicle 101, or control for locking, unlocking, and the like of the doors of the vehicle 101. The GW 4 is connected to a plurality of communication lines constituting an in-vehicle network of the vehicle 101, and relays communication between communication lines. A plurality of ECUs 5 are mounted in the vehicle 101, and are respectively mounted at appropriate positions of the vehicle 101. The ECUs 5 operate in accordance with control data (control instructions) received from the in-vehicle control apparatus 3, and control of the vehicle 101 that is performed by the in-vehicle control apparatus 3 is realized by causing units of the vehicle 101 to perform operations in accordance with the control data.

The in-vehicle network of the vehicle 101 according to the present embodiment has a star network configuration that is centered on the GW 4. That is to say, the in-vehicle wireless communication apparatus 1, the in-vehicle control apparatus 3, and the ECUs 5 mounted in the vehicle 101 are connected to the GW 4 via respective communication lines. The GW 4 transmits data received via one communication line, from another communication line, thus relaying the data. Accordingly, the in-vehicle wireless communication apparatus 1, the in-vehicle control apparatus 3 and the ECUs 5 can transmit/receive data to/from each other via the GW 4. Note that the configuration of the in-vehicle network is not limited to a star network, and various configurations such as a bus network configuration or a ring network configuration may also be adopted, and a plurality of network configurations may also be present.

When the vehicle 101 is travelling normally, the in-vehicle control apparatus 3 transmits control data to the ECUs 5 in accordance with a driving operation performed by the driver, and realizes travelling of the vehicle 101 corresponding to the driving operation. In addition, in the case of automated driving, automated travelling of the 101 is realized by the 3 transmitting control data to the ECUs 5 based on information obtained from various sensors (not illustrated) mounted in the vehicle 101. The control data that is transmitted to the ECUs 5 by the in-vehicle control apparatus 3 is data in which accompanying information such as header information and footer information for communication that is defined in compliance with a communication standard of the in-vehicle network is added to instruction codes and the like defined by the specifications and the like of the ECUs 5 to be controlled. Therefore, for example, the data formats of control data for stopping the vehicle 101 and control data for unlocking the doors of the vehicle 101 are determined in advance in a design stage or the like of the vehicle 101.

In the wireless communication system according to the present embodiment, when enabled to perform wireless communication with the roadside wireless communication apparatus 2, the in-vehicle wireless communication apparatus 1 notifies the roadside wireless communication apparatus 2 of information regarding the format of control data for forcefully stopping the vehicle 101, unlocking the doors, or the like. The information regarding the format can include, for example, the bit length of an instruction code constituting control data and the code type thereof, and information to be set as header information, footer information, and the like. In addition, for example, when control of the vehicle 101 that is performed by the roadside wireless communication apparatus 2 is stopping of the vehicle alone or includes only a few types of control, the in-vehicle wireless communication apparatus 1 may transmit control data itself as information regarding a format to the roadside wireless communication apparatus 2.

The roadside wireless communication apparatus 2 stores the information regarding the format received from the in-vehicle wireless communication apparatus 1, and, if it is determined that the vehicle 101 needs to be forcefully controlled, the roadside wireless communication apparatus 2 generates control data having the stored format, and transmits the control data to the in-vehicle wireless communication apparatus 1. The in-vehicle wireless communication apparatus 1 directly outputs the control data received from the roadside wireless communication apparatus 2 to the in-vehicle network. The control data output by the in-vehicle wireless communication apparatus 1 is relayed to an ECU 3 by the GW 4, and the ECU 3, for example, stops the vehicle 101 in accordance with the received control data. The control data that is transmitted by the in-vehicle wireless communication apparatus 1 at this time may be the same as control data that is normally transmitted by the in-vehicle control apparatus 3, and the GW 4 and the ECUs 5 does not necessarily need to be able to determine whether the received control data has been transmitted by the in-vehicle control apparatus 3 or the in-vehicle wireless communication apparatus 1, based on the content of this control data. Therefore, the GW 4 can transmit control data from the in-vehicle wireless communication apparatus 1, directly to the ECUs 5 without involving the in-vehicle control apparatus 3, and stop the vehicle 101, for example.

Apparatus Configuration

Figure 3:
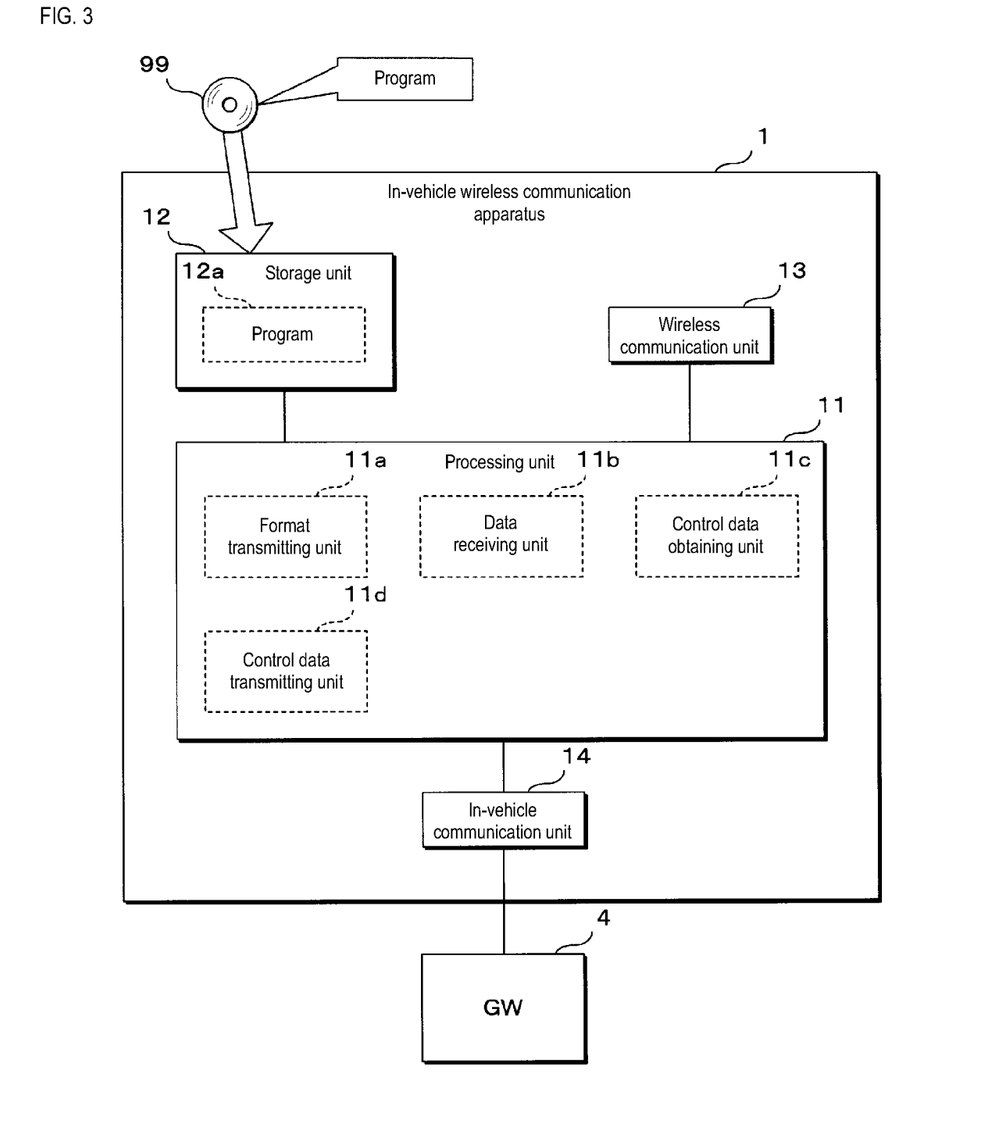
FIG. 3 is a schematic diagram showing a configuration of an in-vehicle wireless communication apparatus according to the present embodiment.

FIG. 3 is a schematic diagram showing the configuration of the in-vehicle wireless communication apparatus 1 according to the present embodiment. The in-vehicle wireless communication apparatus 1 according to the present embodiment is constituted by a processing unit (processor) 11, a storage unit (storage) 12, a wireless communication unit (transceiver) 13, an in-vehicle communication unit (transceiver) 14, and the like. The processing unit 11 is constituted by a computation processing device such as a CPU (Central Processing Unit) or an MPU (Micro-Processing Unit). The processing unit 11 can perform various types of processing by reading out and executing a program stored in the storage unit 12. In this embodiment, the processing unit 11 performs various types of processing such as processing for transmitting information regarding a format of control data for controlling the vehicle 101 to the roadside wireless communication apparatus 2, and processing for outputting control data received from the roadside wireless communication apparatus 2 to the in-vehicle network, by reading out and executing a program 12a stored in the storage unit 12.

The storage unit 12 is constituted by a non-volatile memory element such as a flash memory or an EEPROM (Electrically Erasable Programmable Read Only Memory). The storage unit 12 stores various programs to be executed by the processing unit 11, and various types of data required for processing performed by the processing unit 11. In this embodiment, the storage unit 12 stores the program 12a to be executed by the processing unit 11.

Note that the program 12a may also be written in the storage unit 12 in the manufacturing stage of the in-vehicle wireless communication apparatus 1, for example, or may also be distributed by a remote server apparatus or the like and be obtained by the in-vehicle wireless communication apparatus 1 through communication, for example, or a program recorded in a recording medium 99 such as a memory card or an optical disk may be read out by the in-vehicle wireless communication apparatus 1 and stored in the storage unit 12, for example, or may also be read out and written in the storage unit 12 of the in-vehicle wireless communication apparatus 1 by a writing apparatus, for example. The program 12a may also be provided in a form where it is distributed via a network, or may also be provided in a form where it is recorded in the recording medium 99.

A wireless communication unit 13 performs wireless communication with the roadside wireless communication apparatus 2 provided outside the vehicle 101. The wireless communication unit 13 outputs, from an antenna (not illustrated), a signal obtained by modulating transmission data received from the processing unit 11 and thereby transmits the data to the roadside wireless communication apparatus 2, and receives data from the roadside wireless communication apparatus 2 by demodulating a signal received using the antenna and provides the received data to the processing unit 11.

An in-vehicle communication unit 14 is connected to a communication line that constitutes the in-vehicle network, and transmits/receives data to/from an apparatus such as the in-vehicle control apparatus 3 or the ECUs 5 via the in-vehicle network. In this embodiment, the in-vehicle communication unit 14 transmits/receives data in compliance with the communication standard of Ethernet (registered trademark), CAN (Controller Area Network), or the like. The in-vehicle communication unit 14 can be constituted by an IC (Integrated Circuit) of an Ethernet PHY (PHYsical layer) or a CAN controller. Note that the communication standard that is used by the in-vehicle communication unit 14 is not limited to Ethernet or CAN, and various communication standards may be used. The in-vehicle communication unit 14 outputs transmission data received from the processing unit 11, as electrical signals to the communication line that constitutes the in-vehicle network, thereby transmitting the data. The in-vehicle communication unit 14 also converts electrical signals on the communication line into digital data by sampling and obtaining the potential of the communication line, and provides the data subjected to conversion, as received data to the processing unit 11.

In addition, in the in-vehicle wireless communication apparatus 1 according to the present embodiment, a format transmitting unit 11a, a data receiving unit 11b, a control data obtaining unit 11c, a control data transmitting unit 11d, and the like are realized in the processing unit 11 as software-like function units by the processing unit 11 reading out and executing the program 12a stored in the storage unit 12. Note that, in FIG. 2, function units that perform processing related to control externally performed on the vehicle 101 are illustrated in the processing unit 11, and function units that perform processing other than this are not illustrated.

The format transmitting unit 11a performs processing for causing the wireless communication unit 13 to transmit, to the roadside wireless communication apparatus 2, information regarding a data format of control data for the ECUs 5 mounted in the vehicle 101. Information regarding a data format to be transmitted by the format transmitting unit 11a is, for example, created in advance in the design stage of the vehicle 101 or the like, and is stored in the storage unit 12 in advance in the manufacturing stage of the in-vehicle wireless communication apparatus 1 or the like. Information regarding a data format is, for example, the bit length of an instruction code constituting control data and the code type thereof, and information to be set as header information, footer information, and the like. In addition, for example, when control of the vehicle 101 that is performed by the roadside wireless communication apparatus 2 is only limited to control such as stopping the vehicle or unlocking the doors, control data itself to be transmitted in accordance with control may be used as information regarding a data format. The format transmitting unit 11a adds, to the information regarding the data format, identification information for identifying the vehicle 101, the in-vehicle wireless communication apparatus 1, or the like, and transmits the information to the roadside wireless communication apparatus 2.

The data receiving unit 11b performs processing for receiving various types of data transmitted by the roadside wireless communication apparatus 2, using the wireless communication unit 13. The data receiving unit 11b stores the received data in the storage unit 12, a buffer in the processing unit 11, or the like.

When data received by the data receiving unit 11b is data related to control of the vehicle 101 from the roadside wireless communication apparatus 2, the control data obtaining unit 11c performs processing for obtaining control data included in the received data. The control data obtaining unit 11c obtains control data by removing header information and footer information from the received data, for example.

The control data transmitting unit 11d performs processing for transmitting control data obtained by the control data obtaining unit 11c, to the in-vehicle network using the in-vehicle communication unit 14. The control data transmitted by the control data transmitting unit 11d is relayed to an ECU 3 via the GW 4, and is received by the ECU 3. The ECU 3 handles control data received from the in-vehicle wireless communication apparatus 1 in a similar manner to control data received from the in-vehicle control apparatus 3, and controls the vehicle 101.

Figure 4:
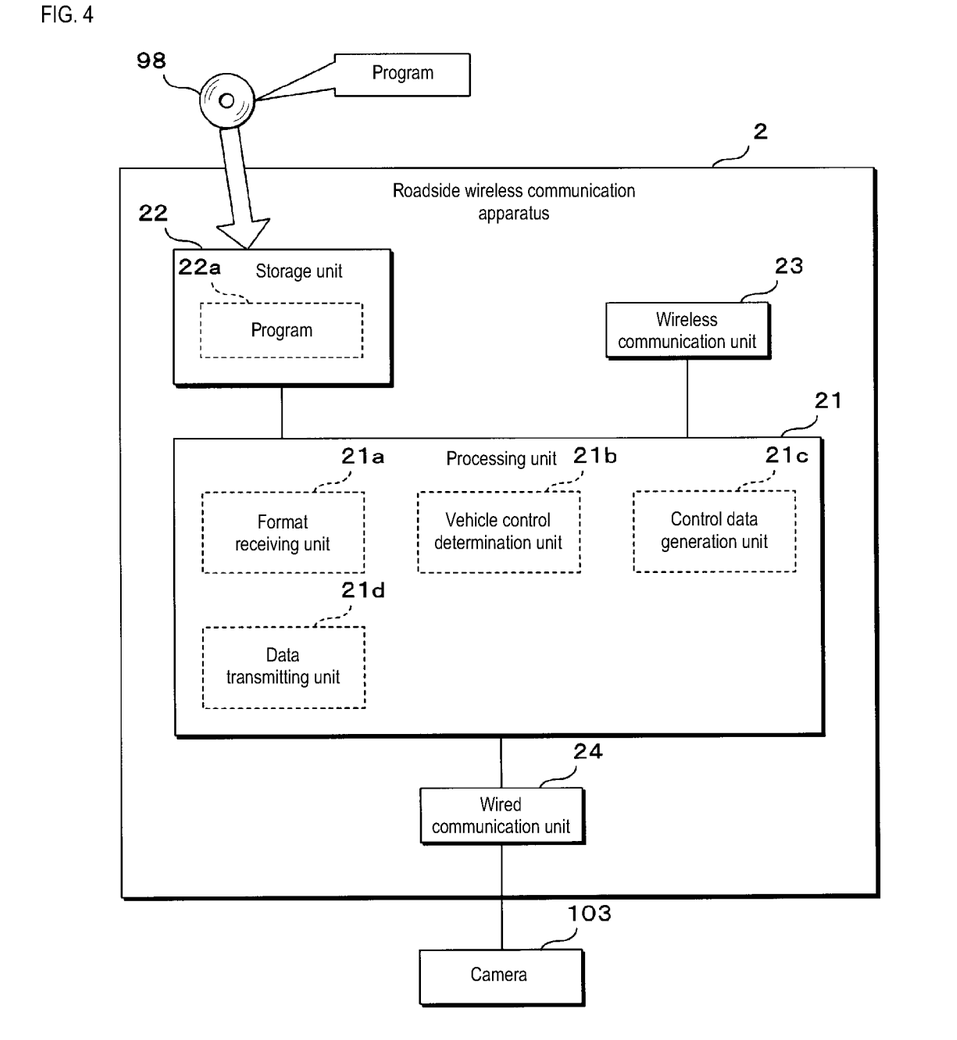
FIG. 4 is a block diagram showing a configuration of a roadside wireless communication apparatus according to the present embodiment.

FIG. 4 is a block diagram showing the configuration of the roadside wireless communication apparatus 2 according to the present embodiment. The roadside wireless communication apparatus 2 according to the present embodiment is constituted by a processing unit (processor) 21, a storage unit (storage) 22, a wireless communication unit (transceiver) 23, a wired communication unit (transceiver) 24, and the like. The processing unit 21 is constituted by a computation processing apparatus such as a CPU or an MPU. The processing unit 21 can perform various types of processing by reading out and executing a program stored in the storage unit 22. In this embodiment, the processing unit 21 performs various types of processing such as processing for determining whether or not the vehicle 101 needs to be controlled, and processing for transmitting control data for forcefully controlling the vehicle 101, to the vehicle 101, by reading out and executing a program 22a stored in the storage unit 22.

The storage unit 22 is constituted by a non-volatile memory element such as a flash memory or an EEPROM. The storage unit 22 stores various programs to be executed by the processing unit 21, and various types of data required for the processing unit 21 to perform processing. In this embodiment, the storage unit 22 stores the program 22a to be executed by the processing unit 21.

Note that the program 22a may also be written in the storage unit 22 in the manufacturing stage of the roadside wireless communication apparatus 2, for example, or may also be distributed by a remote server apparatus or the like and be obtained by the roadside wireless communication apparatus 2 through communication, for example, or a program recorded in a recording medium 98 such as a memory card or an optical disk may be read out by the roadside wireless communication apparatus 2 and stored in the storage unit 22, for example, or may also be read out and written in the storage unit 22 of the roadside wireless communication apparatus 2 by a writing apparatus, for example. The program 22a may also be provided in a form where it is distributed via a network, or may also be provided in a form where it is recorded in the recording medium 98.

The wireless communication unit 23 performs wireless communication with the in-vehicle wireless communication apparatus 1 provided in the vehicle 101. The wireless communication unit 23 outputs, from an antenna (not illustrated), a signal obtained by modulating transmission data received from the processing unit 21, and thereby transmits the data to the in-vehicle wireless communication apparatus 1, and receives data from the in-vehicle wireless communication apparatus 1 by demodulating a signal received using the antenna, and provides the received data to the processing unit 21.

The roadside wireless communication apparatus 2 according to the present embodiment is connected to the camera 103 installed in the vicinity of an intersection in which the traffic light 102 is installed, via a communication line, a signal line, or the like. The camera 103 captures an image of the intersection and the surrounding region thereof, for example, and transmits image (still image or moving image) data obtained through shooting, to the roadside wireless communication apparatus 2. The wired communication unit 24 transmits/receives data to/from the camera 103 via a communication line, a signal line, or the like. The wired communication unit 24 receives data transmitted from the camera 103, provides the data to the processing unit 21, and transmits data received from the processing unit 21 to the camera 103. The wired communication unit 24 may transmit/receive data to/from the camera 103 based on any communication standard. In addition, the wired communication unit 24 may perform communication with the camera 103 via a wide-area network such as the Internet. Note that, in the present embodiment, the roadside wireless communication apparatus 2 performs wired communication with the camera 103, but there is no limitation to this, and the roadside wireless communication apparatus 2 may perform wireless communication with the camera 103. Also, the roadside wireless communication apparatus 2 may transmit/receive data to/from an apparatus other than the camera 103 such as a sensor for detecting the vehicle 101, a pedestrian, or the like that is present in the intersection.

In addition, in the roadside wireless communication apparatus 2 according to the present embodiment, a format receiving unit 21*a*, a vehicle control determination unit 21*b*, a control data generation unit 21*c*, a data transmitting unit 21*d*, and the like are realized in the processing unit 21 as software-like function units by the processing unit 21 reading out and executing the program 22*a* stored in the storage unit 22.

The format receiving unit 21*a* performs processing for receiving information regarding a data format of control data transmitted by the in-vehicle wireless communication apparatus 1 mounted in the vehicle 101. The format receiving unit 21*a* associates the information regarding the data format received from the in-vehicle wireless communication apparatus 1, with the vehicle 101 that has transmitted the information or identification information for identifying the in-vehicle wireless communication apparatus 1 or the like, and stores the information in the storage unit 22, a storage region in the processing unit 21, or the like. Note that the stored information regarding the data format may be discarded after a predetermined period of time has elapsed from when wireless communication with the vehicle 101 or the in-vehicle wireless communication apparatus 1 that transmitted the information was disabled, for example.

The vehicle control determination unit 21*b* performs processing for determining whether or not to forcefully control the vehicle 101 that is present in the vicinity of the intersection, based on image data captured by the camera 103. The vehicle control determination unit 21*b*, for example, predicts whether or not the vehicle 101 shown in the image data is about to be involved in an accident, and determines that this vehicle 101 is to be forcefully stopped if the occurrence of an accident is predicted. Note that the occurrence of an accident may be predicted by the vehicle control determination unit 21*b* using any method, but can be predicted based on the position and the speed of the vehicle 101 shown in image data, the distance between a plurality of vehicles 101, the distance between the vehicle 101 and a pedestrian, or the like. In addition, instead of predicting the occurrence of an accident and determining whether or not to stop the vehicle 101, the vehicle control determination unit 21*b* may determine whether or not to unlock the doors of the vehicle 101 based on whether or not a disaster will occur, for example, and may also determine whether or not to perform various types of control on the vehicle 101, based on factors other than these.

If the vehicle control determination unit 21*b* determines that the vehicle 101 is to be forcefully controlled, the control data generation unit 21*c* performs processing for generating control data for controlling this vehicle 101. The control data generation unit 21*c* obtains the information regarding the data format stored in association with the identification information and the like of the vehicle 101 to be controlled, and generates control data corresponding to the predetermined data format based on the obtained information.

The data transmitting unit 21*d* performs processing for transmitting transmission data that includes the control data generated by the control data generation unit 21*c*, to the vehicle 101 to be controlled, using the wireless communication unit 23. The data transmitted by the data transmitting unit 21*d* is received by the in-vehicle wireless communication apparatus 1 of the vehicle 101, and control corresponding to the control data included in this data is performed on the vehicle 101.

Vehicle Control Method

Figure 5:
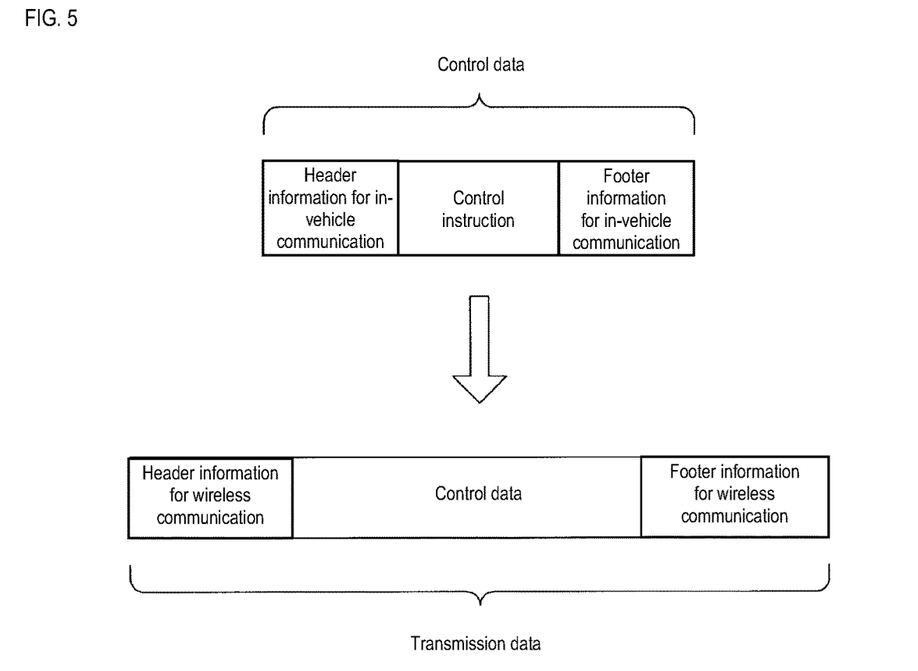
FIG. 5 is a schematic diagram for describing generation and transmission of control data performed by a roadside wireless communication apparatus 2.

FIG. 5 is a schematic diagram for describing the generation and transmission of control data performed by the roadside wireless communication apparatus 2. The control data generation unit 21*c* of the roadside wireless communication apparatus 2 according to the present embodiment generates control data for controlling the vehicle 101, based on information regarding a data format obtained from the in-vehicle wireless communication apparatus 1. In the upper part of FIG. 5, an example of control data generated by the control data generation unit 21*c* is illustrated. Control data generated by the control data generation unit 21*c* has the same data format as control data that is transmitted to the ECUs 5 by the in-vehicle control apparatus 3 in the vehicle 101. The control data has a configuration in which, for example, accompanying information such as header information for in-vehicle communication and footer information for in-vehicle communication that complies with the communication standard of in-vehicle communication of the vehicle 101 is added to a control instruction for the ECUs 5. The information regarding the data format may include the configuration of the header information and footer information, content to be set for the header information and the footer information, and the like, and information such as a code that can be set as a control instruction to be given to the ECUs 5, for example.

The data transmitting unit 21*d* of the roadside wireless communication apparatus 2 generates transmission data in which accompanying information such as header information for wireless communication and footer information for wireless communication that comply with a communication standard of wireless communication is added to control data generated by the control data generation unit 21c, and transmits the transmission data using the wireless communication unit 23. In the lower part of FIG. 5, an example of transmission data generated by the data transmitting unit 21d is illustrated.

The in-vehicle wireless communication apparatus 1 that has received data transmitted by the roadside wireless communication apparatus 2 can obtain control data as a result of the control data obtaining unit 11c removing the header information for wireless communication and the footer information for wireless communication from the received data. The in-vehicle wireless communication apparatus 1 transmits, to the in-vehicle network, the control data obtained by the control data obtaining unit 11c.

The control data transmitted by the in-vehicle wireless communication apparatus 1 is received by the GW 4 of the vehicle 101. The GW 4 handles control data received from the in-vehicle control apparatus 3 of the vehicle 101 and control data received from the in-vehicle wireless communication apparatus 1 as being substantially equivalent, and transmits this control data to the ECU 3 to be controlled. The GW 4 does not need to relay control data received from the in-vehicle wireless communication apparatus 1, to the in-vehicle control apparatus 3.

The ECU 3 that has received the control data relayed by the GW 4 controls the vehicle 101 in accordance with the control data. The ECU 3 handles control data received from the in-vehicle control apparatus 3 and control data receives from the in-vehicle wireless communication apparatus 1 as being substantially equivalent, and performs control corresponding to this control data. Alternatively, the ECU 3 does not necessarily need to be able to distinguish between control data received from the in-vehicle control apparatus 3 and control data received from the in-vehicle wireless communication apparatus 1.

Note that, in the present embodiment, control data created by the roadside wireless communication apparatus 2 includes header information for in-vehicle communication and footer information for in-vehicle communication, but there is no limitation to this. A configuration may also be adopted in which the roadside wireless communication apparatus 2 transmits, to the in-vehicle wireless communication apparatus 1, control data that does not include header information for vehicle communication and footer information for in-vehicle communication, and the in-vehicle wireless communication apparatus 1 adds header information for in-vehicle communication and footer information for in-vehicle communication to control data from the roadside wireless communication apparatus 2, and transmits the control data to the in-vehicle network.

Figure 6:
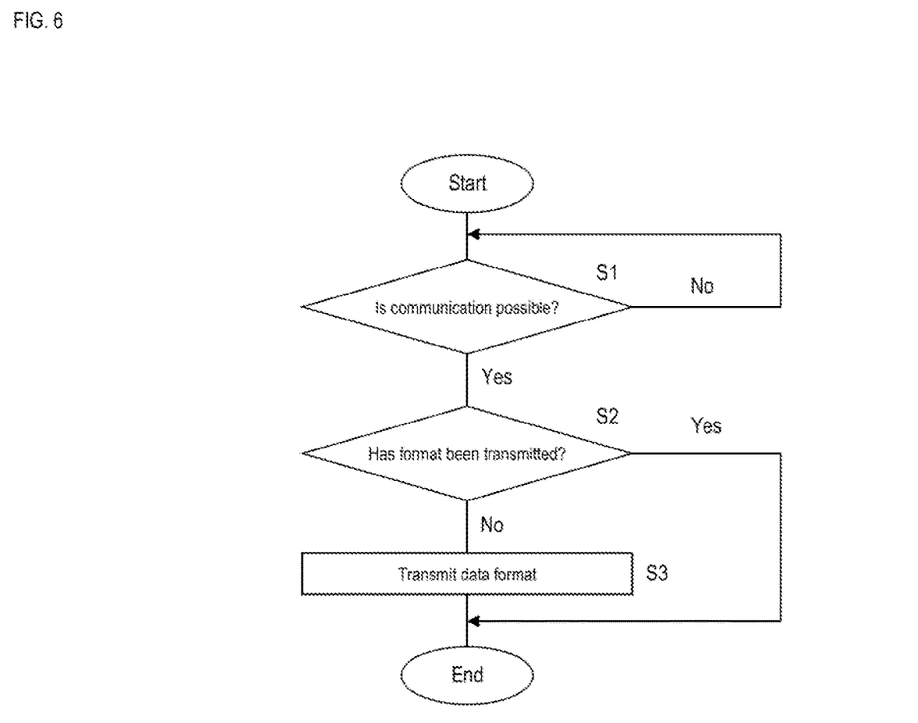
FIG. 6 is a flowchart showing a procedure of format transmitting processing that is performed by the in-vehicle wireless communication apparatus according to the present embodiment.

FIG. 6 is a flowchart showing the procedure of format transmitting processing that is performed by the in-vehicle wireless communication apparatus 1 according to the present embodiment. The format transmitting unit 11a of the processing unit 11 of the in-vehicle wireless communication apparatus 1 according to the present embodiment determines whether or not the wireless communication unit 13 can perform wireless communication with the roadside wireless communication apparatus 2 provided outside the vehicle 101 (step S1). If the wireless communication unit 13 cannot perform communication with the roadside wireless communication apparatus 2 (step S1: NO), the format transmitting unit 11a waits until the wireless communication unit 13 can perform communication with the roadside wireless communication apparatus 2.

If the wireless communication unit 13 can perform communication with the roadside wireless communication apparatus 2 (step S1: YES), the format transmitting unit 11a determines whether or not information regarding a data format of control data has been transmitted to this roadside wireless communication apparatus 2 (step S2). The format transmitting unit 11a stores, for example, identification information for identifying the roadside wireless communication apparatus 2 that performed communication during a predetermined period of time, in association with whether or not the information regarding the data format has been transmitted to this roadside wireless communication apparatus 2, and determines whether or not the information regarding the format has been transmitted, based on the stored information.

If the information regarding the data format has not been transmitted (step S2: NO), the format transmitting unit 11a transmits the information regarding the format stored in the storage unit 12, to the roadside wireless communication apparatus 2 that is communicable therewith (step S3), and ends the format transmitting processing. If the information regarding the data format has been transmitted (step S2: YES), the format transmitting unit 11a ends the format transmitting processing without transmitting the information regarding the data format to the roadside wireless communication apparatus 2.

Figure 7:
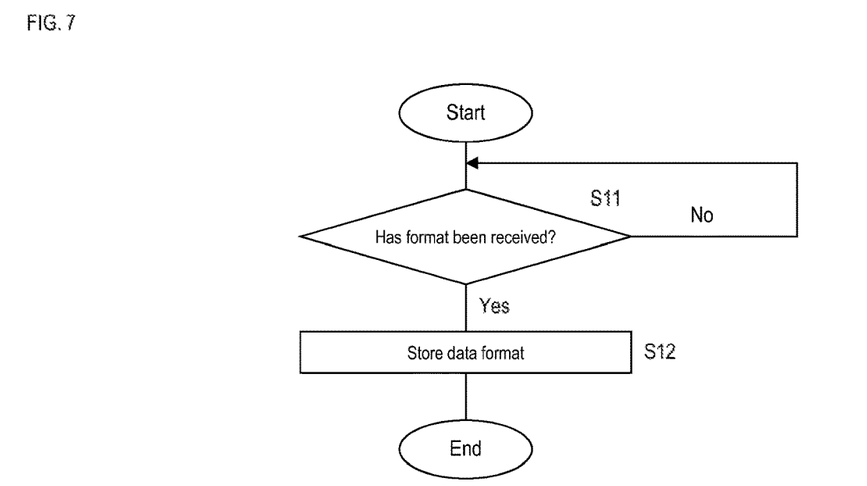
FIG. 7 is a flowchart showing a procedure of format receiving processing that is performed by the roadside wireless communication apparatus according to the present embodiment.

FIG. 7 is a flowchart showing the procedure of format receiving processing that is performed by the roadside wireless communication apparatus 2 according to the present embodiment. The format receiving unit 21a of the processing unit 21 of the roadside wireless communication apparatus 2 according to the present embodiment determines whether or not the wireless communication unit 23 has received information regarding a data format from the in-vehicle wireless communication apparatus 1 (step S11). If the information regarding the data format has not been received (step S11: NO), the format receiving unit 21a waits until the information regarding the data format is received.

If the information regarding the data format has been received from the in-vehicle wireless communication apparatus 1 (step S11: YES), the format receiving unit 21a stores, in the storage unit 12, the received information regarding the data format, for example, in association with identification information of the vehicle 101 that transmitted the information (step S12), and ends the format receiving processing.

Figure 8:
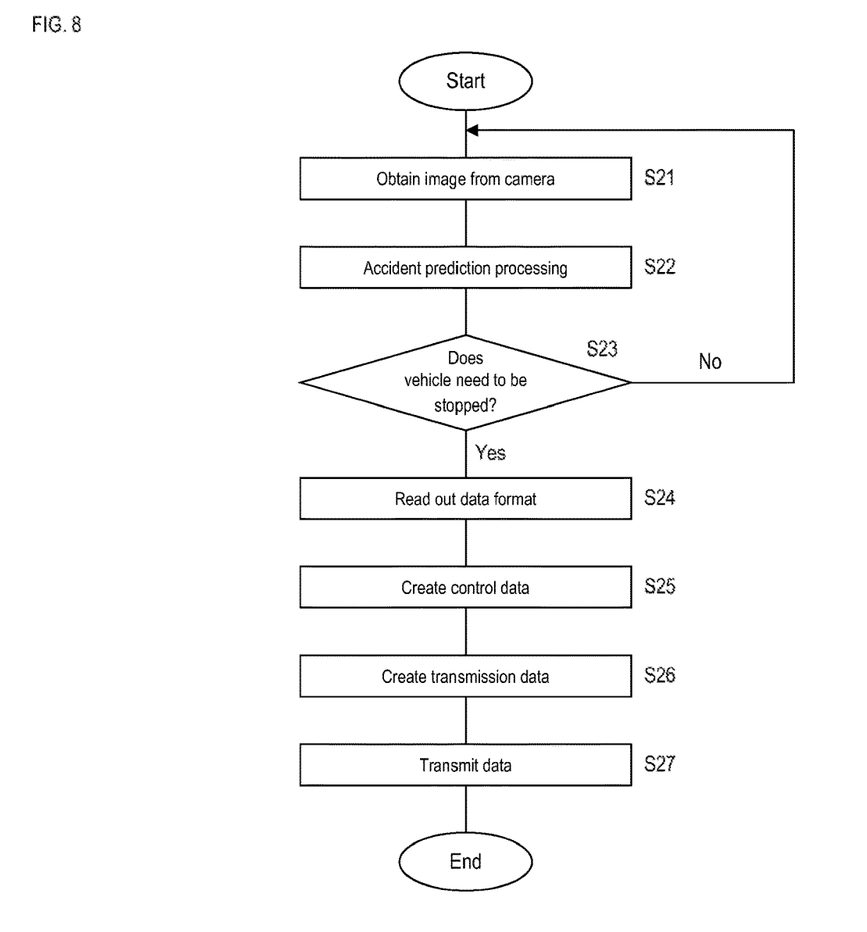
FIG. 8 is a flowchart showing a procedure of control data transmitting processing that is performed by the roadside wireless communication apparatus according to the present embodiment.

FIG. 8 is a flowchart showing the procedure of control data transmitting processing that is performed by the roadside wireless communication apparatus 2 according to the present embodiment. The vehicle control determination unit 21b of the processing unit 21 of the roadside wireless communication apparatus 2 according to the present embodiment obtains image data captured by the camera 103, using the wired communication unit 24 (step S21). The vehicle control determination unit 21b performs accident prediction processing for predicting the occurrence of an accident at an intersection or the like, based on the obtained image data (step S22). Based on the result of the accident prediction processing, the vehicle control determination unit 21b determines whether or not there is a need to perform control for stopping the vehicle 101 (step S23). If there is no need to stop the vehicle 101 (step S23: NO), the vehicle control determination unit 21b returns the procedure to step S21.

If it is determined that there is a need to stop the vehicle 101 (step S23: YES), the control data generation unit 21c of the processing unit 21 reads out the information regarding the data format of control data of the vehicle 101 to be controlled, from the storage unit 12 (step S24). The control data generation unit 21c generates control data for controlling the vehicle 101, in accordance with the read data format (step S25). The data transmitting unit 21d of the processing unit 21 generates transmission data by adding accompanying information such as header information and footer information required for wireless communication to the control data generated by the control data generation unit 21c (step S26). The data transmitting unit 21d transmits the generated transmission data to the vehicle 101 to be controlled by the wireless communication unit 23 (step S27), and ends the control data transmitting processing.

Figure 9:
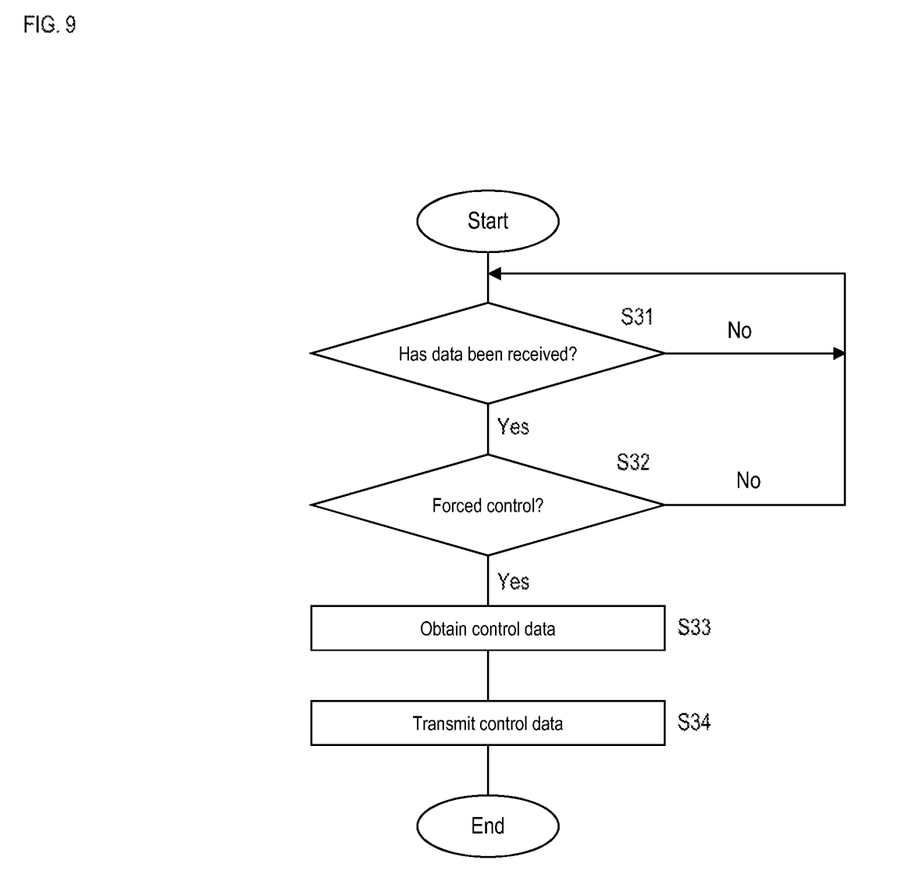
FIG. 9 is a flowchart showing a procedure of control data receiving processing that is performed by the in-vehicle wireless communication apparatus according to the present embodiment.

FIG. 9 is a flowchart showing the procedure of control data receiving processing that is performed by the in-vehicle wireless communication apparatus 1 according to the present embodiment. The data receiving unit 11b of the processing unit 11 of the in-vehicle wireless communication apparatus 1 according to the present embodiment determines whether or not the wireless communication unit 13 has received data from the roadside wireless communication apparatus 2 (step S31).

If data from the roadside wireless communication apparatus 2 has not been received (step S31: NO), the data receiving unit 11b waits until data from the roadside wireless communication apparatus 2 is received.

If data from the roadside wireless communication apparatus 2 has been received (step S31: YES), the data receiving unit 11b determines whether or not the received data is data for forcefully controlling the vehicle 101 (step S32). The roadside wireless communication apparatus 2 adds, to the header information for wireless communication, information such as a flag indicating whether or not transmission data includes control data for forcefully controlling the vehicle 101, and transmits the data. The data receiving unit 11b can determine whether or not the received data is data for forcefully controlling the vehicle 101, based on information such as this flag included in the header information for wireless communication of the received data. If the received data is not data for forcefully controlling the vehicle 101 (step S32: NO), the data receiving unit 11b handles the received data as normal data, and returns the procedure to step S31.

If the received data is data for forcefully controlling the vehicle 101 (step S32: YES), the control data obtaining unit 11c of the processing unit 21 obtains the control data by removing the accompanying information such as the header information for wireless communication and the footer information for wireless communication, the accompanying information having been added to the received data (step S33). The control data transmitting unit 11d of the processing unit 11 transmits the control data obtained by the control data obtaining unit 11c, to the in-vehicle network using the in-vehicle communication unit 14 (step S34), and ends the processing.

Overview

The wireless communication system according to the present embodiment that has the above-described configuration controls the vehicle 101 in response to the in-vehicle control apparatus 3 transmitting (outputting) control data to the in-vehicle network, and the in-vehicle wireless communication apparatus 1 transmits information regarding the data format of this control data to the roadside wireless communication apparatus 2 provided outside the vehicle 101, through wireless communication. Accordingly, the roadside wireless communication apparatus 2 can be aware of the data format of control data for controlling the vehicle 101, and when there is a need to externally forcefully control the 101, the roadside wireless communication apparatus 2 can create control data corresponding to this data format, and transmit the control data to the vehicle 101. The in-vehicle wireless communication apparatus 1 that has received data from the roadside wireless communication apparatus 2 transmits (outputs) the control data included in the received data to the in-vehicle network. Accordingly, the vehicle 101 is subjected to control corresponding to control data transmitted to the in-vehicle network. The roadside wireless communication apparatus 2 generates control data in accordance with the data format that the in-vehicle wireless communication apparatus 1 made a notification of in advance and transmits the control data, and, as a result, the vehicle 101 that has received the control data is controlled simply by transmitting/receiving the received control data without interpretation or the like of a control instruction from the roadside wireless communication apparatus 2, and thus it can be expected that the vehicle 101 will be promptly controlled from the outside.

In addition, in the wireless communication system according to the present embodiment, the in-vehicle control apparatus 3 and the ECUs 3 to be controlled by this in-vehicle control apparatus 3 are mounted in the vehicle 101, and the vehicle 101 is controlled in response to the ECUs 3 receiving control data from the in-vehicle control apparatus 3. The in-vehicle wireless communication apparatus 1 that has received data from the roadside wireless communication apparatus 2 directly transmits control data included in this data to the ECUs 3, without involving the in-vehicle control apparatus 3. Accordingly, control data can be more promptly transmitted from the in-vehicle wireless communication apparatus 1 to the ECUs 3 without delay or the like due to the in-vehicle control apparatus 3 intervening.

In addition, in the wireless communication system according to the present embodiment, the roadside wireless communication apparatus 2 transmits control data for stopping travelling of the vehicle 101 to the in-vehicle wireless communication apparatus 1, and the vehicle 101 stops travelling in accordance with this control data. Accordingly, when travelling of the vehicle 101 is stopped externally for the purpose of preventing the occurrence of an accident in advance or the like, it can be expected that the vehicle 101 is more promptly stopped.

In addition, in the wireless communication system according to the present embodiment, the roadside wireless communication apparatus 2 transmits, to the in-vehicle wireless communication apparatus 1, control data for unlocking the doors of the vehicle 101, and the vehicle 101 unlocks the doors in accordance with this control data. Accordingly, when a disaster or the like occurs and there is an urgent need to unlock the doors, it can be expected that the doors are more promptly unlocked.

In addition, in the wireless communication system according to the present embodiment, data that is transmitted to the in-vehicle wireless communication apparatus 1 by the roadside wireless communication apparatus 2 includes control data for controlling the vehicle 101 and accompanying information such as header information and footer information that accompanies wireless communication. The in-vehicle wireless communication apparatus 1 removes the accompanying information from the received data and obtains control data, and directly transmits the obtained control data to the in-vehicle network, thereby realizing control of the vehicle 101 corresponding to the control data. The in-vehicle wireless communication apparatus 1 can obtain control data by performing simple processing for removing accompanying information.

Note that the present embodiment adopts a configuration in which the roadside wireless communication apparatus 2 performs wireless communication with the vehicle 101 and forcefully controls the vehicle 101, but there is no limitation to this. An apparatus that performs wireless communication with the vehicle 101 and an apparatus that controls the vehicle 101 based on image data captured by the camera 103 may be different apparatuses. Similarly, a configuration is adopted in which the in-vehicle wireless communication apparatus 1 performs wireless communication with the roadside wireless communication apparatus 2, processing for transmitting information regarding data format, and processing for transmitting control data, but there is no limitation to this. An apparatus that performs wireless communication with the roadside wireless communication apparatus 2 and an apparatus that performs processing for transmitting information regarding a data format and processing for transmitting control data may be different apparatuses.

Each apparatus in the in-vehicle system includes a computer constituted by a microprocessor, a ROM, a RAM, and the like. A computation processing unit such as a microprocessor may read out a computer program that includes some or all of the steps in the sequence diagram or the flowchart such as those shown in FIGS. 3 and 5, from a storage unit such as a ROM or a RAM, and execute the computer program. Computer programs of these apparatuses can be installed from an external server apparatus or the like. In addition, computer programs of these apparatuses are distributed in a state of being stored in a recording medium such as a CD-ROM, a DVD-ROM or a semiconductor memory.

The embodiments disclosed herein are to be considered as illustrative and non-limiting in all aspects. The scope of the present disclosure is indicated not by the above-stated meanings but by the claims, and all changes that come within the meaning and range of equivalency of the claims are intended to be embraced therein.

The invention claimed is:

1. An in-vehicle wireless communication apparatus that is to be mounted in a vehicle, the apparatus comprising:
a wireless communication unit configured to perform wireless communication with an out-of-vehicle apparatus installed outside the vehicle, and a processing unit configured to perform processing related to communication,
wherein the processing unit transmits information regarding a data format of control data to be output to an in-vehicle network by an in-vehicle control apparatus that controls the vehicle, to the out-of-vehicle apparatus using the wireless communication unit,
receives data transmitted from the out-of-vehicle apparatus using the wireless communication unit, the data including control data having the data format, and
outputs the control data included in the received data to the in-vehicle network.

2. The in-vehicle wireless communication apparatus according to claim 1, wherein the in-vehicle control apparatus and an in-vehicle apparatus to be controlled by the in-vehicle control apparatus are mounted in the vehicle, and the processing unit transmits the control data included in data received from the out-of-vehicle apparatus, to the in-vehicle apparatus without involving the in-vehicle control apparatus.

3. The in-vehicle wireless communication apparatus according to claim 2, wherein the control data included in the data received from the out-of-vehicle apparatus is control data for causing the in-vehicle apparatus to perform control for stopping travelling of the vehicle.

4. The in-vehicle wireless communication apparatus according to claim 2, wherein the control data included in the data received from the out-of-vehicle apparatus is control data for causing the in-vehicle apparatus to perform control for unlocking doors of the vehicle.

5. The in-vehicle wireless communication apparatus according to claim 1, wherein data that is received from the out-of-vehicle apparatus includes the control data and accompanying information that accompanies wireless communication, and
the processing unit outputs the control data obtained by removing the accompanying information from the data received from the out-of-vehicle apparatus, to the in-vehicle network.

6. A wireless communication system, wherein wireless communication is performed between an in-vehicle wireless communication apparatus that is to be mounted in a vehicle, and includes a wireless communication unit configured to perform wireless communication with an apparatus outside the vehicle and a processing unit configured to perform processing related to communication, and an out-of-vehicle apparatus that is to be mounted outside the vehicle, and includes a wireless communication unit configured to perform wireless communication with the vehicle and a processing unit configured to perform processing related to communication, and
the processing unit of the in-vehicle wireless communication apparatus transmits, to the out-of-vehicle apparatus, information regarding a data format of control data to be output to an in-vehicle network by an in-vehicle control apparatus that controls the vehicle,
the processing unit of the out-of-vehicle apparatus receives the information regarding the data format transmitted by the in-vehicle wireless communication apparatus,
generates control data for controlling the vehicle based on the received information, the control data having the data format, and
transmits data that includes the generated control data to the in-vehicle wireless communication apparatus, and
the processing unit of the in-vehicle wireless communication apparatus receives the data transmitted by the out-of-vehicle apparatus, and
outputs the control data included in the received data to the in-vehicle network.

7. The wireless communication system according to claim 6, wherein an in-vehicle apparatus to be controlled by the in-vehicle control apparatus and an in-vehicle relay apparatus that receives control data transmitted by the in-vehicle control apparatus and transmits the control data to the in-vehicle apparatus are mounted in the vehicle, and
the in-vehicle relay apparatus receives control data transmitted by the in-vehicle wireless communication apparatus, and transmits the received control data to the in-vehicle apparatus without involving the in-vehicle control apparatus.

8. A wireless communication apparatus comprising:
a wireless communication unit configured to perform wireless communication with a vehicle, and a processing unit configured to perform processing related to communication,
wherein the processing unit receives information regarding a data format transmitted by the vehicle,
generates control data for controlling the vehicle based on the received information, the control data having the data format, and
transmits data that includes the generated control data to the vehicle.

* * * * *